(12) United States Patent
Perez (10) Patent No.: US 11,055,977 B2
(45) Date of Patent: Jul. 6, 2021

(54) EXPANDING SECURITY TAG

(71) Applicant: Sensormatic Electronics, LLC, Boca Raton, FL (US)

(72) Inventor: Sergio M. Perez, Lake Worth, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 16/806,739

(22) Filed: Mar. 2, 2020

(65) Prior Publication Data

US 2021/0090414 A1 Mar. 25, 2021

Related U.S. Application Data

(60) Provisional application No. 62/903,498, filed on Sep. 20, 2019.

(51) Int. Cl.
*G08B 13/24* (2006.01)
*E05B 73/00* (2006.01)
*G06K 19/077* (2006.01)

(52) U.S. Cl.
CPC ...... *G08B 13/2417* (2013.01); *E05B 73/0017* (2013.01); *G06K 19/07749* (2013.01); *G08B 13/2434* (2013.01)

(58) Field of Classification Search
CPC ............ G08B 13/2417; G08B 13/2434; E05B 73/0017; G06K 19/07749
See application file for complete search history.

(56) References Cited

U.S. PATENT DOCUMENTS

2014/0077954 A1* 3/2014 Luo ..................... E05B 17/0029
340/572.8

* cited by examiner

*Primary Examiner* — Hongmin Fan
(74) *Attorney, Agent, or Firm* — Arent Fox, LLP (57) ABSTRACT

A security device configured to be secured to an article. The security device includes a tag having an expandable portion with a retracted dimension and an expanded dimension. Applying a first removal force to the tag in an attempt to remove the security device from the article releases the expandable portion causing a dimension of the tag to increase from the retracted dimension to the expanded dimension.

20 Claims, 8 Drawing Sheets

EXPANDING SECURITY TAG

CROSS-REFERENCE TO RELATED APPLICATION

This application claims the benefit of U.S. Provisional Application Ser. No. 62/903,498, entitled "EXPANDING SECURITY TAG" and filed on Sep. 20, 2019, which is expressly incorporated by reference herein in its entirety.

TECHNICAL FIELD

The present disclosure relates generally to a security device configured to be secured to an article; more particularly to a security device that is configured to expand if tampered with.

BACKGROUND

An Electronic Article Surveillance (EAS) system is designed to prevent unauthorized removal of an item from a controlled area. A typical EAS system may comprise a monitoring system and one or more security tags. The monitoring system may create a surveillance zone at an access point for the controlled area. A security tag may be fastened to the monitored item, such as an article of clothing. If the monitored item enters the surveillance zone, an alarm may be triggered indicating unauthorized removal.

The security tag may be fastened to a number of different items. It may be desirable for a system to allow authorized release of the security tag, while making unauthorized release relatively difficult. Consequently, there may be a need for improved techniques in security tags in general.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In accordance with one aspect of the disclosure, a security device configured to be secured to an article is disclosed. The security device includes a tag, which may hereinafter interchangeably be referred to as a first expanding security device, having an expandable portion with a retracted dimension and an expanded dimension, wherein applying a first removal force to the tag in an attempt to remove the security device from the article releases the expandable portion causing a dimension of the tag to increase from the retracted dimension to the expanded dimension.

In accordance with another aspect of the disclosure, a security device configured to be secured to an article is disclosed, the security device includes a first tag having an expandable portion with a retracted dimension and an expanded dimension. The security device further includes a second tag, which may hereinafter be interchangeably referred to as a second expandable security device or second security device, that is removably connectable to the first tag, wherein applying a first removal force to the first tag in an attempt to separate the first tag from the second tag releases the expandable portion causing a dimension of the first tag to increase from the retracted dimension to the expanded dimension.

In accordance with another aspect of the disclosure, a security device configured to be secured to an article is disclosed, the security device includes a first tag having an expandable portion with a retracted dimension and an expanded dimension and a second tag that is removably connectable to the first tag. Applying a first removal force to the first tag or second tag in an attempt to separate the first tag from the second tag releases a biasing force causing configured to bias the expandable portion and causing a dimension of the first tag to increase from the retracted dimension to the expanded dimension.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting. Further, it will be obvious to one skilled in the art that the present aspects may be practiced without these specific details. In other instances, well-known methods, procedures, and components have not been described in detail so as to not unnecessarily obscure aspects of the present aspects.

The instant disclosure relates to a method and apparatus related to the connection of Electronic article surveillance systems (EAS) tags to articles that are to be secured. EAS systems are used for inventory control and to prevent theft and similar unauthorized removal of articles from a controlled area. Typically, in such systems a system transmitter and a system receiver are used to establish a surveillance zone which must be traversed by any articles being removed from a controlled area.

An EAS security tag may be affixed to each article (such as, but not limited to, clothing) and may include an active or passive device configured to interact with a signal being transmitted by the system transmitter into the surveillance zone. This interaction causes a further signal to be established in the surveillance zone and the signal may be received by the system receiver. Accordingly, upon movement of a tagged article through the surveillance zone, a signal will be received by the system receiver, identifying the unauthorized presence of the tagged article in the zone. Certain types of EAS security tags have been designed to be reusable and, thus, include releasable attachment devices for affixing the tags to the articles. Such attachment devices are further designed to be releasable by authorized personnel only so that unauthorized removal of a tag from a corresponding article is avoided. To this end, many attachment devices are made releasable only through the use of an associated special tool or detaching mechanism.

Attachment devices for EAS security tags include a wide variety of different latching mechanisms designed to prevent unauthorized personnel from removing the pin from the tag. The stimulus needed to unlatch an EAS security tag depends upon the particular latching mechanism in use. Accordingly, a variety of different detaching units utilize various means to separate reusable, removable EAS security tags from articles of merchandise. Systems for unlatching EAS security tags include devices which may involve the application of a force to certain latching components of the EAS security tag. The force can be applied directly to latching components via a mechanical element (e.g. a probe or hook inserted into the tag) unlatching the tag and/or indirectly via magnet, for example. Regardless of how the force is applied, the result is a disengagement of a latching element that was previously engaged with an attachment pin in the tag, thereby allowing the tag to be removed from the article.

Aspects of the disclosure are described with reference to the attached figures. The figures are not drawn to scale and they are provided merely to illustrate the instant disclosure. Several aspects of the disclosure are described below with reference to example applications for illustration. It should be understood that numerous specific details, relationships, and methods are set forth to provide a full understanding of the aspects. One having ordinary skill in the relevant art, however, will readily recognize that the aspects can be practiced without one or more of the specific details or with other methods. In other instances, well-known structures or operation are not shown in detail to avoid obscuring the disclosure. The disclosure is not limited by the illustrated ordering of acts or events, as some acts may occur in different orders and/or concurrently with other acts or events. Furthermore, not all illustrated acts or events are required to implement a methodology in accordance with the disclosure.

Figure 1A:
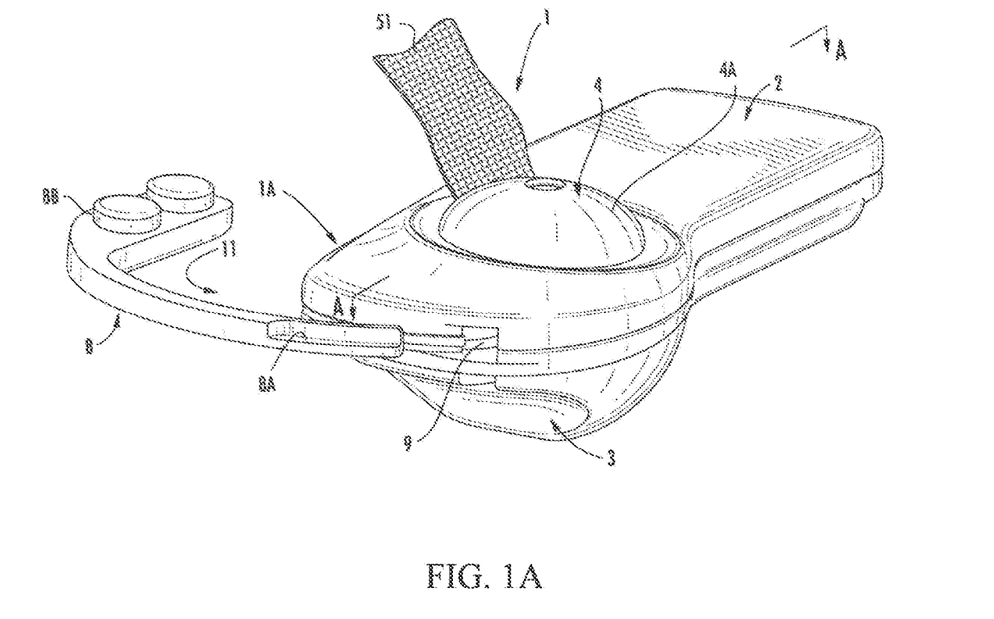
FIG. 1A is an example EAS tag that is useful for understanding the current disclosure.
Figure 1B:
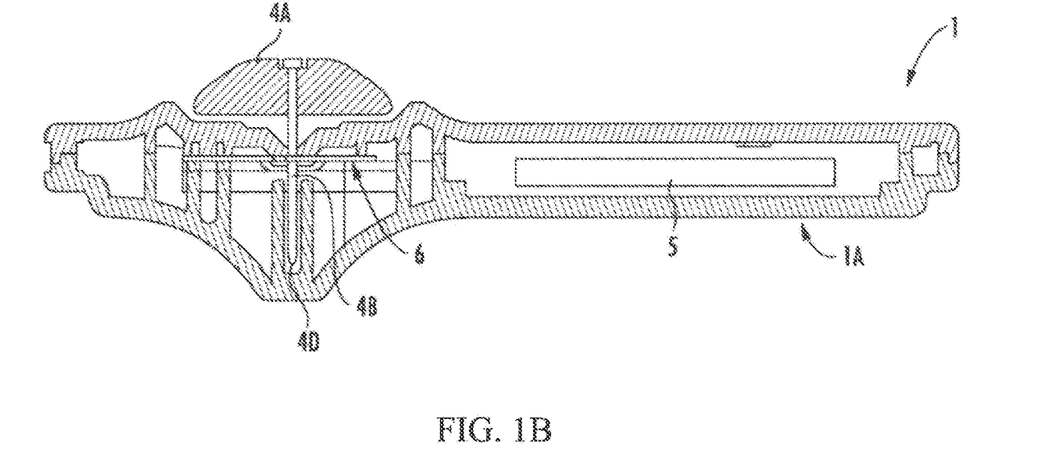
FIG. 1B is a cross-sectional view of the EAS tag in FIG. 1, taken along line A-A.

FIGS. 1A and 1B include one example of an EAS security tag 1. The present aspects are not limited to use with an EAS security tag 1 as shown, but a brief description of such an exemplary tag is useful for understanding the inventive arrangements. The tag 1 includes an upper housing 2 and a lower housing 3 which are joined along corresponding side walls to form a closed tag body 1A. The tag 1 further includes a tack assembly 4 having an enlarged tack head 4A, an elongated tack body 4B, and a pointed forward end 4D (see, FIGS. 1, and 2). The tack assembly 4 is used to attach the tag body 1A to an article 51 which is to be protected by the EAS tag 1. In order to detect the presence of the tag, an EAS sensor 5 is provided which generates detectable signals. For example the EAS sensor 5 can be an acoustically resonant magnetic sensor. A wide variety of EAS sensors are known in the art and therefore such sensors will not be described here in detail. However, it should be understood that any suitable EAS sensor can be provided in the EAS security tag 1.

The article 51 is joined to the tag body 1A by the tack assembly 4 by inserting the tack body 4B into an opening in the wall of the upper housing 2. When the tack body 4B is fully inserted, the pointed end of the tack is received in an upstanding cavity or collar extending from an inner surface of the lower housing. The tack head 4A, in turn, seats in a recessed area in the upper housing. The article 51 is thus held between the tack head 4A and the housing. A locking element 6 is provided within the tag body for releasably preventing the tack body 4B from being withdrawn from the tag body. The tack assembly 4 and the article 51 thus become releasably locked to the EAS tag 1.

A hook 8 may be needed to reach and release the locking mechanism inside the security tag and, thus, detach the tack assembly 4 and the article from the tag body 1A. In one example, the tag body 1A is configured so that access to the internal locking mechanism is through an arcuate channel accessible through a curved slot 9 defined by one or more inner walls of the tag body 1A. In order to release the tack 4 from the tag body 1A, the hook 8 is introduced into the curved slot 9 of the tag body 1A via rotation of the hook about its rearward end 8B. The rotation is indicated by arrow 11 in FIG. 1A. This action causes the hook to be inserted within the tag until the forward end 8A of the hook reaches and passes into the inner end of the channel to effect the unlocking operation. In other aspects of the disclosure a magnet or electromagnet within a detacher device may impart a magnetic force on a ferromagnetic element within a tag body causing the tag to release the tack from the tag body. Some additional EAS tags that are usable with the current disclosure include but are not limited to: SuperTag Ink®, SuperTag®, SuperTag II®, and/or SuperTag III®, all manufactured by Sensormatic of Baca Raton Fla.

In some situations, it may be desirable to provide an increased surface area to the security device connected to the article. For example, increasing the size and/or surface area of the EAS security tag 1 and/or tack assembly 4 in FIGS. 1A and 1B may prevent unauthorized removal of the device and additionally may prevent an article from being usable and/or repairable if an attempt is made to cut or otherwise forcefully remove the security device from the article.

However, an increase in size and/or surface area of the security device has the disadvantage of potentially causing a distraction to a potential customers or may be in the way when a customer tries an article on, to name a few example disadvantages.

In addition, it may be desirable to provide notice or some indication that a security device attached to an article has been tampered with and/or that somebody has attempted to remove the security device from the article. By providing articles with security devices that give a visual indication that the security device has been tampered with, store employees may be able to observe patterns such as specific articles and/or styles or types of articles that may be subject to theft, for example.

For context, a brief overview of the function of one example of a security device, which may for example include an expandable security device, which may hereafter be interchangeably referred to as a first security device, in accordance with one aspect of the disclosure will be described with reference to FIGS. 2-4.

The example security device may include an expandable security device 200 and a second security device (e.g., an EAS tag 1 as described with reference to FIGS. 1A and 1B). In the example of FIGS. 2-4, an expandable security device 200 may replace tack assembly 4 in FIGS. 1A and 1B, for example. The expandable security device 200 may for example include a tack body 201 that is configured to be received by a receiving portion 110 of the second security device 100. Thus, the expandable security device 200 may be detachably connectable to the second security device 100 in a similar fashion as described with reference to FIGS. 1A and 1B above. Specifically, if the tack body 201 of the expandable security device 200 is aligned with the receiving portion 110 of the second security device 100, and a force in direction 51 (FIG. 2) is applied, the expandable security device 200 connects to the second security device and is not removable unless separation of the expanding security device 200 and second security device 100 is effected by a specific detacher device (e.g., a detacher device with a hook 8 as described with relation to FIG. 1A above).

Figure 2:
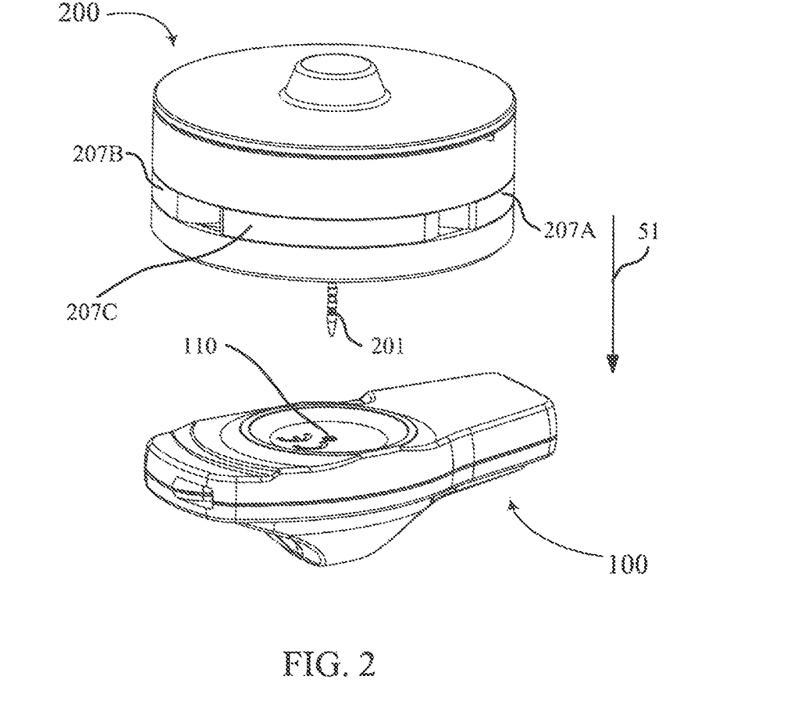
FIG. 2 is a perspective view of an example of a first security device and second security device separated in accordance with one aspect of the disclosure.
Figure 3:
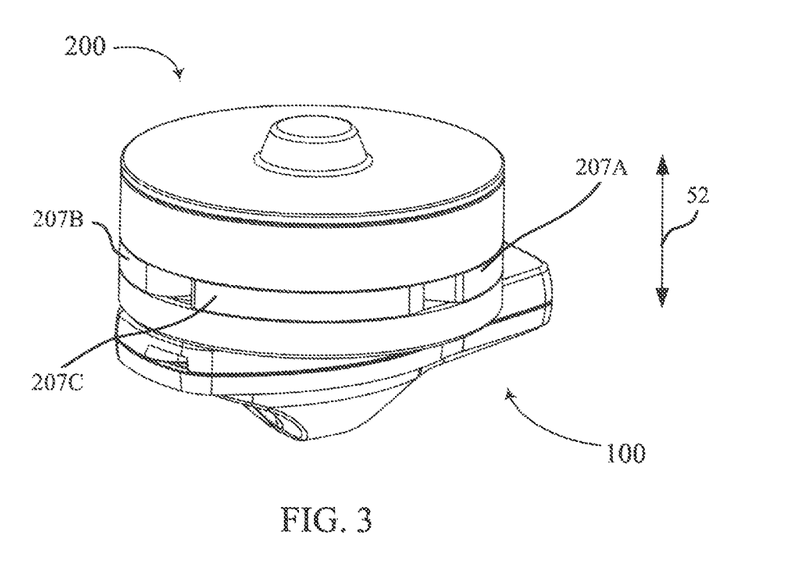
FIG. 3 is a perspective view of an example of the first security device and second security device of FIG. 2 in a connected state in accordance with one aspect of the disclosure.
Figure 4:
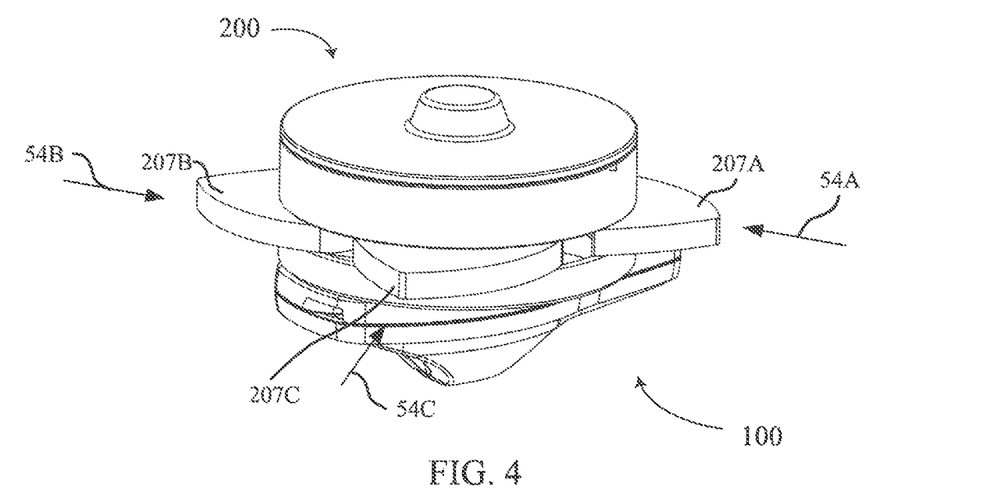
FIG. 4 is a perspective view of an example of the first security device and second security device of FIGS. 2-3 in a connected state in and with the first security device in an expanded state in accordance with one aspect of the disclosure.

The expandable security device 200 may include a plurality of expanding portions 207A, 207B, 207C, and 207D (207D is hidden from view in FIGS. 2-4). The expanding portions 207A-D may be configured to expand (e.g., as shown in FIG. 4) if a force is applied in either of directions 52 (FIG. 3), for example, in an attempt to remove the expanding security device 200 and the second security device 100 from an article, expanding portions 207A-D are configured to expand as shown in FIG. 4, thus making unauthorized removal of the expandable security device 200 and/or first security device from an article more difficult. In addition, the expansion of expanding portions 207A-D as shown in FIG. 4 provides a visual indication that the security device has been tampered with and/or that there has been an unauthorized attempt to remove the expanding security device 200 and/or second security device 100 from an article. In one example, the expanding portions may for example be formed of a material having a bright or contrasting color (e.g., red, yellow, or orange) to further provide such a visual indication. Additionally, it should be noted that the plurality of expanding portions may include any number, and is not limited to the example of 4 expanding portions described herein.

The expanding portions 207A-D of the security device may remain open or biased in an open direction until a resetting device is placed in contact or near the expanding security device 200, and at least one of and/or all of the expanding portions 207A-D are pressed inward (e.g., in directions 54A-C) in order to "reset" the expanding security device 200 so that that the expanding portions 207A-D remain in the retracted or non-expanded position (e.g., as shown in FIGS. 2 and 3). In another example, the expanding portions 207A-D may remain open or biased in an expanded position until the expanding security 200 is removed from the second security device 100 via a specific detacher device (e.g., a detacher device with a hook 8 as described with relation to FIG. 1A above), at which point any one of and/or all of the expanding portions 207A-D may be pressed inward (e.g., in directions 54A-C) in order to "reset" the expanding security device 200 so that that the expanding portions 207A-D remain in the retracted or non-expanded position (e.g., as shown in FIGS. 2 and 3).

Figure 5:
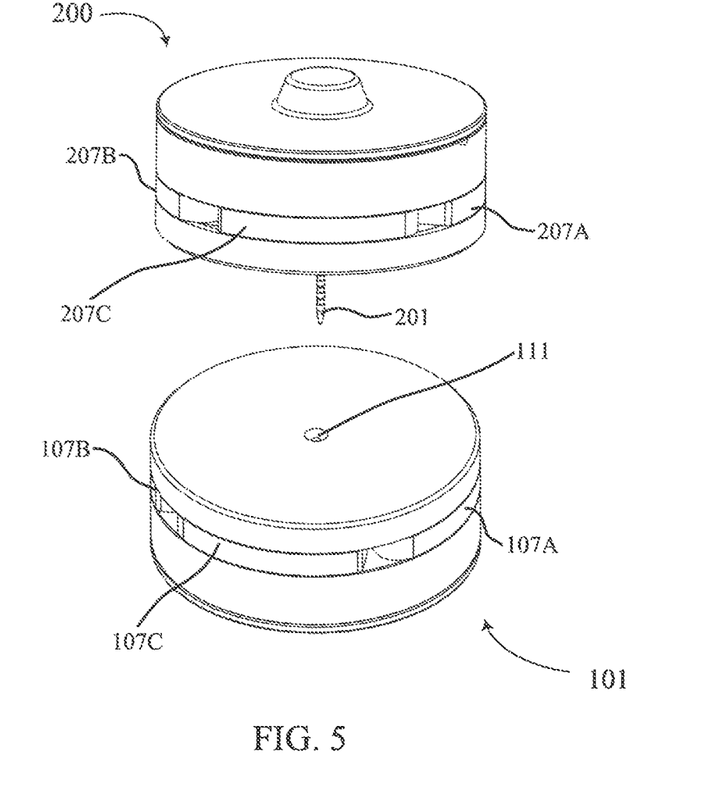
FIG. 5 is a perspective view of an example of the first security device and second security in a separated state in accordance with one aspect of the disclosure.
Figure 6:
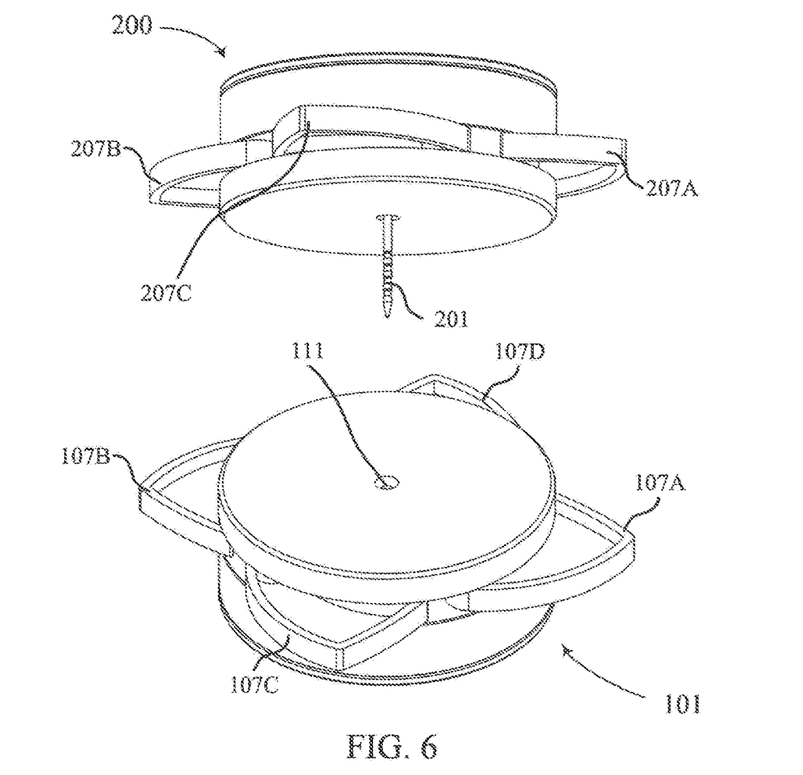
FIG. 6 is a perspective view of an example of the first security device and second security device of FIG. 5 in a separated state with each security device in an expanded state in accordance with one aspect of the disclosure.

FIGS. 5 and 6 include another example implementation of the current disclosure. The security device may include the aforementioned expanding security device 200, which may hereinafter be interchangeably referred to as a first expanding security device, and a second expanding security device 101. In one example, the second expanding security device 101 may include a receiving portion 111 for receiving the tack body 201 of the first expanding security device 200. Either one of or both of the first expanding security device 200 or the second expanding security device may further include therein an EAS sensor similar to EAS sensor 5 described with relation to FIG. 1B. In addition, the second expanding security device 101 may include a locking element (e.g., similar to locking element 6 in FIG. 1B) and may lock and release in a similar fashion as described above with relation to FIGS. 1A and 1B.

The second expanding security device may include second expanding portions 107A, 107B, 107C, and 107D that are configured to expand if an attempt is made to separate the second expanding security device 101 from the first expanding security device 200. The second expanding portions 107A-D of the second expanding security device 101 may function in a similar fashion as expanding portions 207A-D described above. Once the expanding portions 107A-D of the second expanding portion and/or the expanding portions 207A-D are in the expanded position, the expanding portions 107A-D and/or 207A-D may remain open or biased in an open direction until a resetting device is placed in contact or near the second expanding security device 101 or the expanding security device 200. Once a resetting device is placed in contact with or near the first expanding security device 200 and/or the second expanding security device 101, at least one of and/or all of the expanding portions 107A-D and/or 207A-D may be pressed inward (e.g., in directions 54A-C) in order to "reset" the expanding security device 200 so that that the expanding portions 207A-D remain in the retracted or non-expanded position (e.g., as shown in FIG. 5). In another example, the expanding portions 207A-D and/or second expanding portions 107A-D may remain open or biased in an expanded position until the expanding security device 200 is removed from the second expanding security device 101 via a specific detacher device (e.g., a detacher device with a hook 8 as described with relation to FIG. 1A above). Once the first expanding security device 200 and the second expanding security device 101 are separated using the detacher device, any one of and/or all of the expanding portions 207A-D and/or second expanding portions 107A-D may be pressed inward (e.g., in directions 54A-C) in order to "reset" the devices so that that the expanding portions 207A-D and/or second expanding portions 107A-D remain in the retracted or non-expanded position (e.g., as shown in FIGS. 2 and 3).

Figure 7:
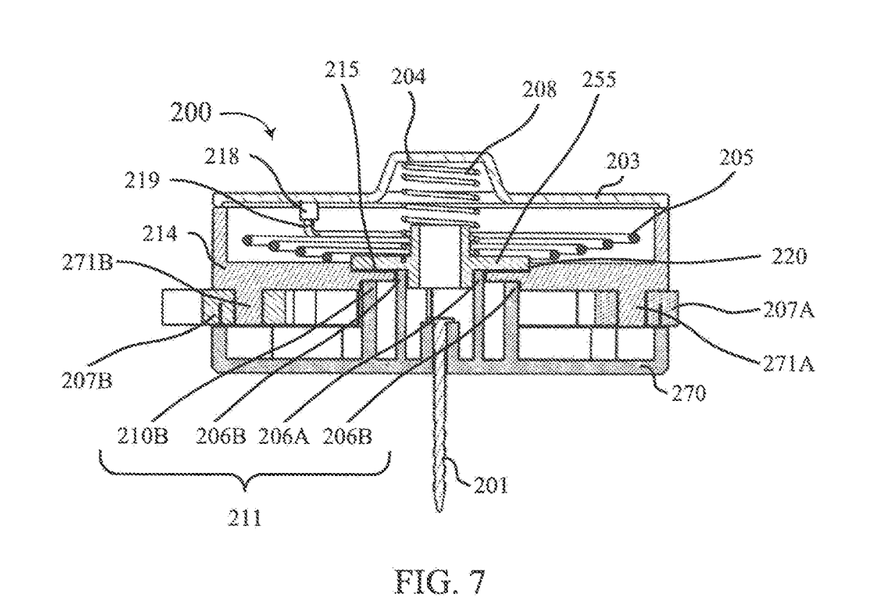
FIG. 7 is a cut-away view of the example security device in FIGS. 2-6 in accordance with one aspect of the disclosure.
Figure 8:
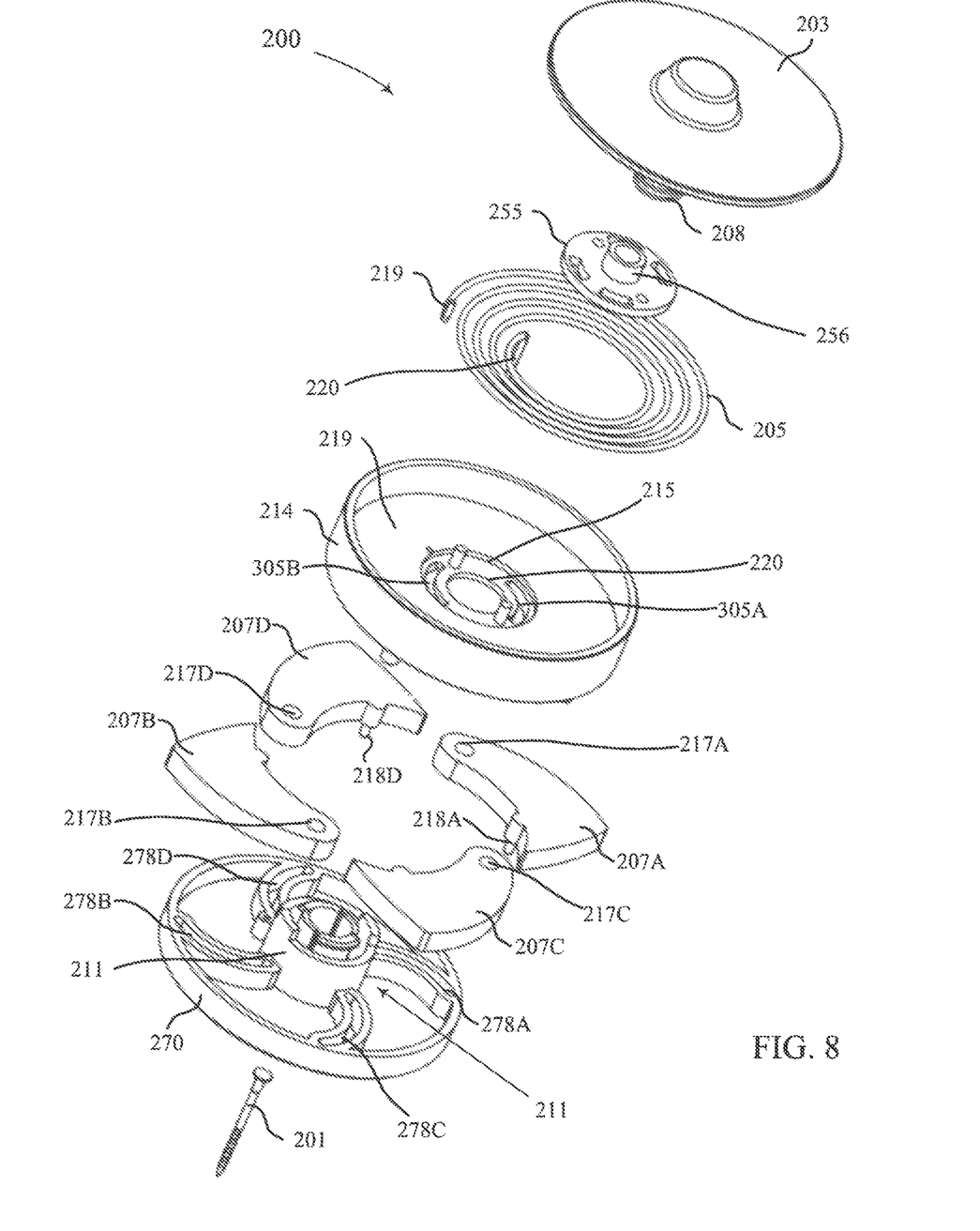
FIG. 8 is a top exploded view of the example security device in FIGS. 2-7 in accordance with one aspect of the disclosure.
Figure 9:
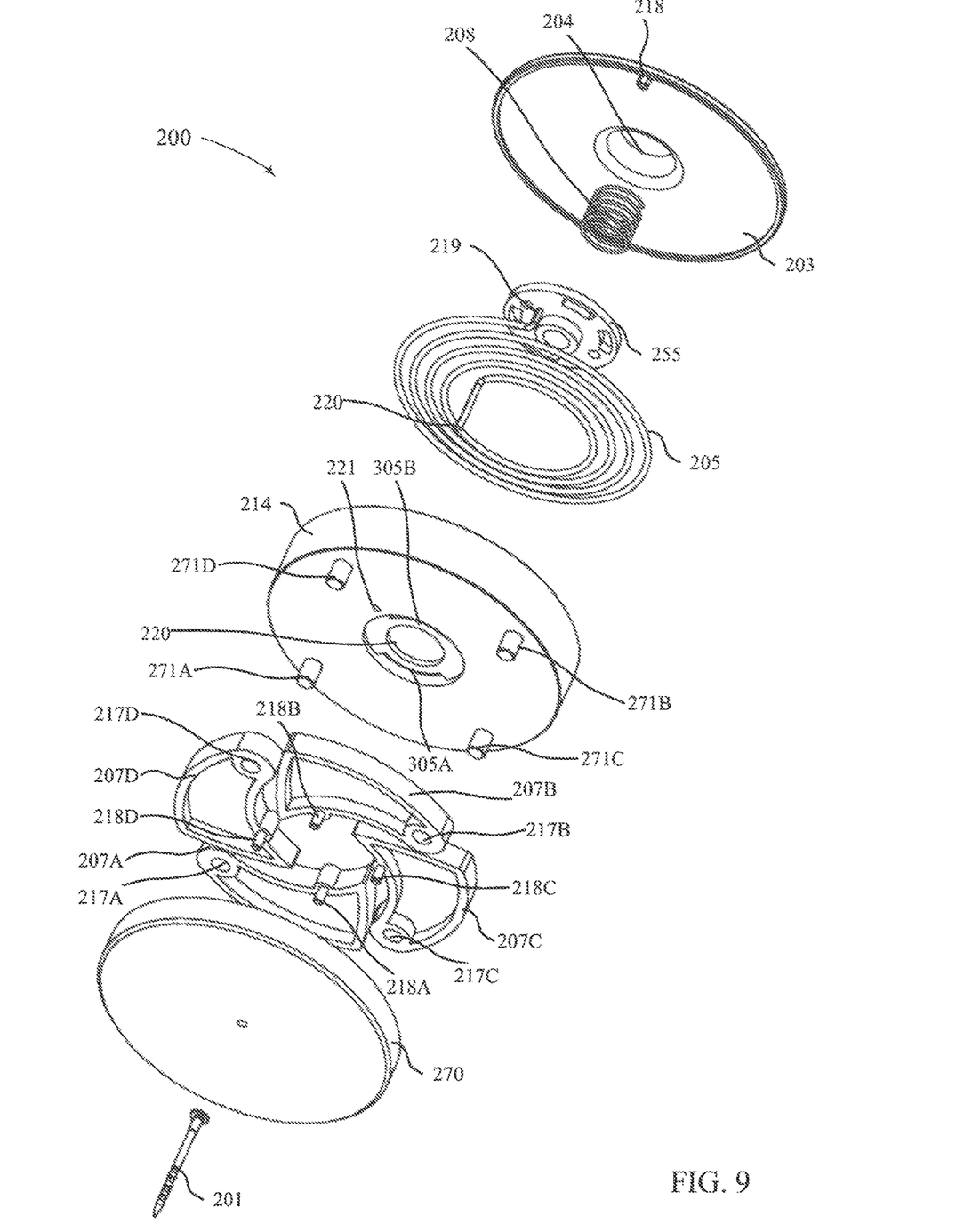
FIG. 9 is a bottom exploded view of the example first security device in FIGS. 2-8 in accordance with one aspect of the disclosure.

FIG. 7 includes an example cross-sectional view and FIGS. 8 and 9 include example top and bottom exploded views of one example of an expandable security device 200. The expandable security device may include a cap 203 with a biasing member receiving portion 204. The biasing member receiving portion 204 may be configured to receive a biasing member 208, which may for example be a coil spring or elastic equivalent. In one example, the biasing member 208 (e.g., coil spring) may interface with a locking member 255. For example, the locking member 255 may include a cylindrical extension 256 (FIG. 8) configured to receive the biasing member 208 thereon. As described in further detail below, the locking member 255 may be formed of a ferrous material that is capable of receiving a magnetic attractive force from a magnet or electromagnet, for example. The expandable security device 200 may further include a first rotating housing 214. The rotatable housing 214 may include a locking member receiving portion or recessed portion 215 configured to selectively receive locking member 255. In one example, the first rotating housing 214 may include a series of pivot posts 271A-D for receiving and having rotatably connected thereto respective pivot post receiving portions 217A-D of expanding portions 207A-D. Each of the expanding portions 207A-D may further include respective track followers 218A-D. The track followers 218A-D are configured to be slideably contained with respective tracks 278A-D in a track housing 270. Thus, once the expandable security device 200 is assembled, expanding portions 207A-D pivot about respective pivot posts 271A-D of the rotatable housing 214. In addition, respective track follower 218A-D is guided within each of respective tracks 278A-C of the track housing 270. Thus, rotation of the rotatable housing 214 relative to the track housing in a first direction causes the expanding portions 207A-D to retract, and rotation of the rotatable housing 214 with relation to the track housing 270 in a second direction opposite the first direction causes the expanding portions 207A-D to expand.

Figure 10:
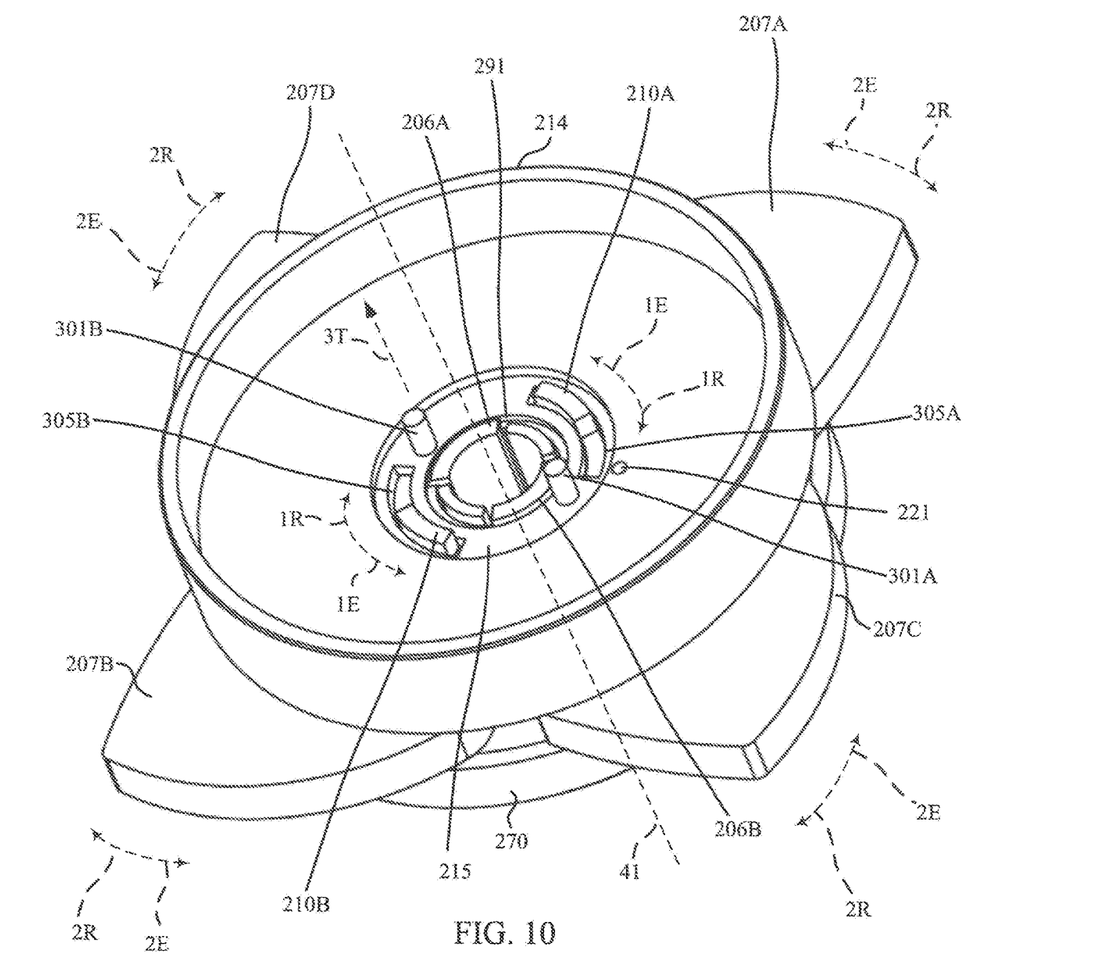
FIG. 10 is a top perspective partially assembled view of the example security device in FIGS. 2-9 in accordance with one aspect of the disclosure.
Figure 11:
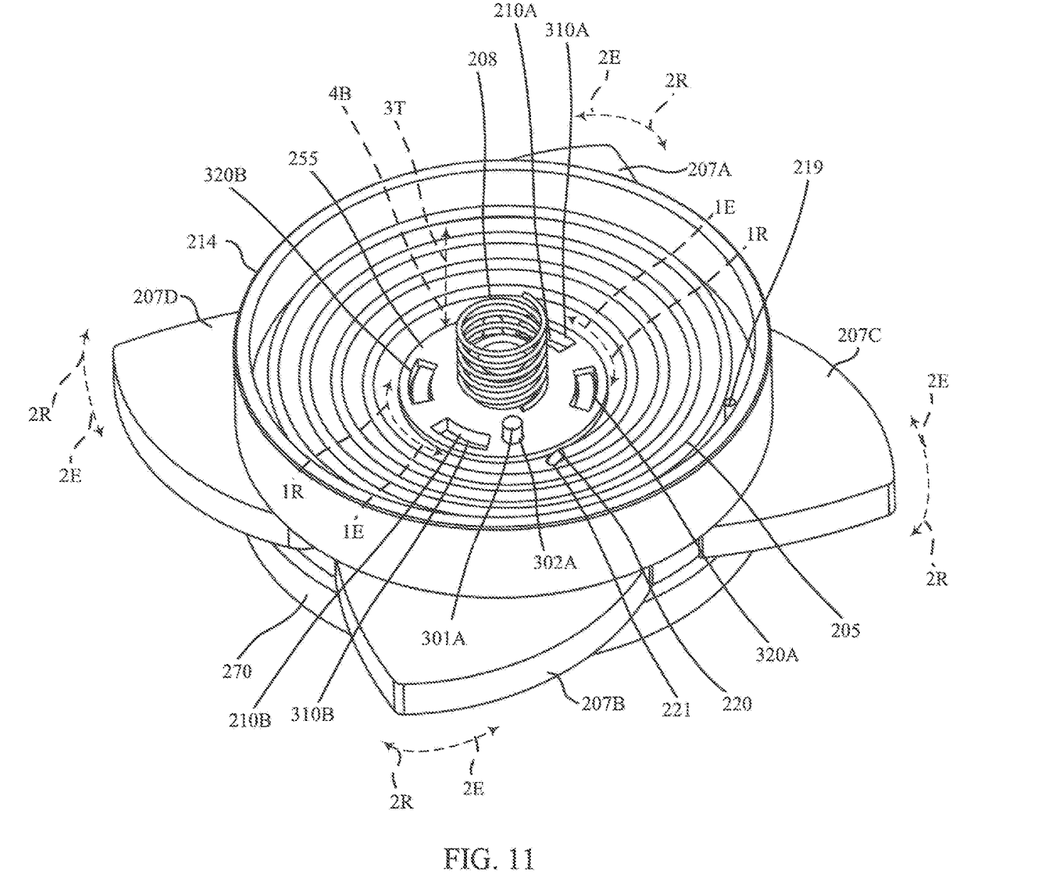
FIG. 11 is a top perspective partially assembled view of the example security device in FIGS. 2-10 in accordance with one aspect of the disclosure.

FIGS. 10 and 11 include examples of the expandable security device 200 with portions of the device removed in order to provide a clearer overview of one example of the expansion and retraction functionality of the expandable security device 200. Referring to FIG. 10, the rotatable housing 214 may be rotatably connected to the track housing 270. The rotatable housing may be rotatable about axis 41 with respect to the track housing 270. The rotatable housing may include an opening 220 (FIGS. 9 and 10) and a recessed portion 215 surrounding the opening 220. In one example, the track housing 270 may be configured to rotatably connect to the interface portion 211 (FIGS. 7 and 8) of the track housing 270 via opening 220 (FIGS. 9 and 10) of the rotatable housing 214, while still allowing limited upward movement in direction 3T. In one aspect, and as described in further detail with respect to FIG. 11 below, the upward movement in direction 3T of the rotatable housing 314 relative to the track housing 270 (e.g., due to an attempt to separate the expandable security device 200 from an article) causes the expanding portions 207A-D to move from a retracted positon to an expanded position. One example of the aforementioned rotatable connection between the rotatable housing 214 and the track housing 270 includes snap fit portions 303A and 303B of interface portion 211 (FIGS. 7 and 8), which may fit into a channel 291 within recessed portion 215 and provide a rotatable interface between the track housing 270 while preventing the rotatable housing 214 from being completely separated from the track housing 270. In addition, the rotatable housing may include a series of stop tracks 305A and 305B configured to receive stop protrusions 210A and 210B, of the interface portion 211 (FIGS. 7 and 9) of the track housing 270.

The interaction between the stop tracks 205A and 205B and the stop protrusions 210A and 210B may limit a relative rotation of the rotatable housing 214 and the track housing 270. Referring to FIG. 10, if the track housing 270 is held stationary, rotation of the rotatable housing 214 in direction 1E causes the expanding portions 207A-D to expand in directions 2E due to the guiding of each respective track follower 218A-D (FIG. 9) within each of respective tracks 278A-C (FIG. 8) of the track housing 270 as described in further detail above. Likewise, rotation of the rotatable housing 214 in direction 1R causes the expanding portions 207A-D to retract in directions 2R.

FIG. 11 includes one example of the expandable security device 200 with the cap 203 removed. The expandable security device may include a torsion spring 205 that is configured to provide a biasing force to the expanding portions 207A-D by causing rotation of rotatable housing 214 with relation to the track housing 270. As mentioned above, rotation of the rotatable housing 214 with relation to the track housing causes the expansion or retraction of expanding portions 207A-D via the interaction of each respective track follower 218A-D (FIG. 9) within each of respective tracks 278A-C (FIG. 8) of the track housing 270 and the interaction of pivot posts 271A-D of the rotatable housing 214 with the pivot post receiving portions 217A-D of each respective expanding portion 207A-D. The torsion spring 205 may include a first end 220 received through a torsion spring receiving portion 221 of the rotatable housing 214. A second end 219 of the torsion spring 205 may be received and held stationary by a second end receiving portion 218 (shown in FIGS. 7 and 9) of cap 203. The aforementioned structure causes the torsion spring 205 to bias the expanding portions 207A-D in direction 2E.

Further referring to FIG. 11, the locking member may include a series of retracted position receiving slots 320A-B and a series of expanded position receiving slots 310A-B. Both the retracted position receiving slots 320A-B and the expanded position receiving slots 310A-B are configured to captively receive respective stop protrusions 210A-B of the track housing 270. In addition, the aforementioned recessed portion 215 of the rotatable housing 214 may further include a set of posts 301A and 301B (FIG. 10—Hidden from view in FIG. 11) configured to be received by post receiving portions 302A and 302B (hidden from view in FIG. 11) of the locking member 155. Thus, when the stop protrusions 210A-B are engaged with the expanded position receiving slots 310A-B of the locking portion 155, the expanding portions 207A-D are locked in the expanded position (e.g., as in FIG. 11). Likewise, if the stop protrusions 210A-B are engaged with the retracted position receiving slots 320A-B, the expanding portions 207A-D are locked in the retracted position (e.g., as shown in FIGS. 2, 3, and 5).

The locking member 255 may be biased in a downward direction (e.g., direction 4B) into the recessed portion 215 (FIG. 10) of the rotatable housing 214 by biasing member 208. The interaction between the post receiving portions 302A-B of the locking member 155 and respective posts 301A-B of the rotatable housing 214 allow the locking member 255 to move in an upward direction (e.g., direction 3T), if a force that is greater than the biasing force of the biasing member 208 is imparted on the locking member 255 while preventing the locking member 255 from rotating with relation to the rotatable housing 214. In one example, the locking member 255 may be formed of a ferrous material and an attractive magnetic force may be applied to the locking member 255 by a magnetic resetting and/or detaching device to cause the locking member 255 to move in an upward direction (e.g., direction 3T). The attractive force applied by the magnet of the resetting and/or detaching device may be great enough to overcome the biasing force of biasing member 208 and thus cause the locking device to move in upward direction causing the locking member 255 to separate from the recessed portion 215 (FIG. 10) of the rotatable housing 214 and further cause a disengagement between the stop protrusions 210A-B and either the expanded position receiving slots 310A-B (when the expanding portions 207A-D are in the expanded position) or the retracted position receiving slots 320A-B (when the expanding portions are in the retracted position). Further, as mentioned above, an upward movement in direction 3T of the rotatable housing 314 relative to the track housing 270 that overcomes the downward biasing force provided by biasing member 108 on locking member 255 (e.g., due to an attempt to separate the expandable security device 200 from an article) would also cause a disengagement between the stop protrusions 210A-B and the retracted position receiving slots 320A-B of the locking member 155.

The aforementioned structure causes the expandable security device 200 to expand if an attempt is made to remove the security device 200 from an article and allows the expandable security device to be "reset" via use of a detachment device. In one example expansion operation, if the expanding portions 207A-D are in the retracted position (e.g., as in FIGS. 2, 3, 5, 7, and 9), the locking member 255 is biased downward in direction 4B. With the expanding portions 207A-D in the retracted position, the engagement between the stop protrusions 210A-B and the retracted position receiving slots 320A-B prevents the rotatable housing from rotating with respect to the track housing 270 due to the force imparted by the torsion spring 205. However, if the rotatable housing 214 is pulled away from the track housing 270 or a second security device that is connected to the track housing 270 via tack body 201 (i.e., in an attempt to remove the security device from an article), the force overcomes the biasing force provided by biasing member 108 causing a momentary separation and disengagement between the stop protrusions 210A-D and the retracted position receiving slots 320A-B causing the torsion spring 205 to effect a relative rotation between the rotatable housing 214 and the track housing 270. The rotation of the rotatable housing due to the force applied by the torsion spring causes the expanding portions 207A-D to move in directions 2E to the expanded position as in FIG. 11. Further, the aforementioned rotation causes the stop protrusions 210A-D to engage with the expanded position receiving slots 310A-B as in FIG. 11, thus locking the expanding portions 207A-D in the expanded position.

Further, once the expanding portions are in the expanded position, the expandable security device 200 device may be "reset" or allow for the expanding portions 207A-D to be returned to the retracted position and locked in place. In one example a magnetic detachment device is placed upon or in the vacuity of cap 203 (FIGS. 7-9). The magnetic detachment device supplies a sufficient magnetic force in direction 3T (FIG. 11) to the ferrous locking member 255 to overcome the biasing force provided by biasing member 208 causing a separation and disengagement between the stop protrusions 210A-D and the expanded position receiving slots 310A-B. A user and/or the detachment device may apply an inward force (e.g., inward directions 54A-D in FIG. 4) to any one of and/or all of the expanding portions 207A-D to overcome the biasing force provided by the torsion spring 205 and causing the upper housing to rotate so that the stop protrusions 210A-B are proximal to the retracted position receiving slots 310A-B of the locking member 255. The magnetic force applied by the detachment device may then be removed causing the biasing member 208 to move the locking member downward in direction 4B and causing the stop protrusions 210 to engage with the retracted position receiving slots 310A-B. Thus, the device may be "reset" with the expandable portions 207A-D in the retracted position.

It is noted that any one of or a combination of the aforementioned features may be usable within an EAS tag or security device. In addition, the aforementioned examples are not intended to be limiting. For example, while a magnetic removal device and ferrous locking member 255 are given as examples, a mechanical device may directly contact the locking member 255 perform the same functions, to name one example. Similarly, while an example of a method of disconnecting examples of the first security device or first expandable security device from the second security device or second expandable security device using a hook 8 is given, the first security device or first expandable security device may be disconnected from the second security device or second expandable security device via the application of a magnetic force, to name another example. Numerous modifications are possible in light of the above teachings, including a combination of the abovementioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

The foregoing description of various aspects and examples have been presented for purposes of illustration and description. It is not intended to be exhaustive nor to limit the disclosure to the forms described. The embodiment(s) illustrated in the figures can, in some instances, be understood to be shown to scale for illustrative purposes.

What is claimed is:

1. A security device configured to be secured to an article, comprising:
    a tag having a plurality of expandable portions configured to expand from an outer surface of the tag so the tag has a retracted dimension and an expanded dimension,
    wherein the tag includes a dimension that is configured to increase in response to a first removal force received by the tag, wherein the increase in the dimension is based on the expandable portion being configured to release and move from the retracted dimension to the expanded dimension in response to the first removal force.

2. A security device configured to be secured to an article, comprising:
    a tag having an expandable portion with a retracted dimension and an expanded dimension,
    wherein the tag includes a dimension that is configured to increase in response to a first removal force received by the tag, wherein the increase in the dimension is based on the expandable portion being configured to release and move from the retracted dimension to the expanded dimension in response to the first removal force; and a second tag configured to be detachably connected to the tag, wherein the tag and the second tag are connectable along a first direction, wherein the first removal force is a force in a second direction opposite the first direction.

3. The security device of claim 2, wherein the second tag further comprises a locking and releasing mechanism configured to lock or release the tag and second tag, wherein the expandable portion of the tag is retractable to the retracted dimension from the expanded dimension in response to the release mechanism releasing the tag and the second tag.

4. The security device of claim 3, wherein the expandable portion is configured to maintain the retracted dimension in response to the release mechanism releasing the tag and the tag being removed from the second tag in the second direction.

5. The security device of claim 2, wherein the expandable portion of the tag is retractable to the retracted dimension from the expanded dimension in response to a magnetic force being applied to the tag.

6. The security device of claim 1, wherein the tag further comprises a connection pin and a second tag comprises a receiving portion for receiving the connection pin.

7. The security device of claim 6, wherein the connection pin is operatively connected to the plurality of expandable portions.

8. The security device of claim 1, wherein the security device further comprises:
a track housing having a series of tracks; and
wherein each of the plurality of expanding portions has a follower that is slideably contained within a respective one of the plurality of tracks.

9. The security device of claim 2, wherein the second tag comprises a second tag expandable portion with a second retracted dimension and a second expanded dimension, wherein the second tag includes a dimension that is configured to increase in response to a second removal force received by the second tag, wherein the increase in dimension is based on the second expandable portion being configured to release and move from the retracted dimension to the expanded dimension in response to the second removal force.

10. The security device of claim 9, wherein the second tag further comprises a second tag connection portion that is operatively connected to the second tag expandable portion.

11. The security device of claim 10, wherein the second tag connection portion is a receiving portion for receiving a pin of the tag.

12. A security device configured to be secured to an article, the security device comprising:
a first tag having an expandable portion with a retracted dimension and an expanded dimension;
a second tag that is removably connectable to the first tag, wherein the first tag includes a dimension that is configured to increase in response to a first removal force received by the tag, wherein the increase in the dimension is based on the expandable portion being configured to release and move from the retracted dimension to the expanded dimension in response to the first removal force.

13. The security device of claim 12, wherein the second tag further comprises a locking and releasing mechanism configured to lock or release the first tag and second tag, wherein the expandable portion of the first tag is retractable to the retracted dimension from the expanded dimension in response to the release mechanism releasing the first tag from the second tag.

14. The security device of claim 13, wherein the expandable portion maintains the retracted dimension in response to the release mechanism releasing the first tag from the second tag.

15. The security device of claim 12, wherein the expandable portion of the tag is retractable to the retracted dimension from the expanded dimension in response to a magnetic force is applied to the first tag.

16. The security device of claim 12, wherein the first tag further comprises a connection pin and the second tag comprises a receiving portion for receiving the connection pin.

17. The security device of claim 16, wherein the connection pin is operatively connected to the expandable portion.

18. The security device of claim 12, wherein the security device further comprises:
a track housing having a series of tracks; and
wherein the expandable portion comprises a plurality of expanding portions, wherein each of the expanding portions has a follower that is slideably contained within a respective one of the plurality of tracks.

19. The security device of claim 18, further comprising a rotatable housing, wherein the expandable portions are connected to the rotatable housing via respective pivots, wherein the expanding portions are between the rotatable housing and the track housing.

20. The security device of claim 12, wherein the second tag comprises a second tag expandable portion with a second retracted dimension and a second expanded dimension, wherein the second tag includes a dimension that is configured to increase in response to a second removal force received by the second tag, wherein the increase in dimension is based on the second expandable portion being configured to release and move from the retracted dimension to the expanded dimension in response to the second removal force.

* * * * *